Patented July 16, 1946

2,403,937

UNITED STATES PATENT OFFICE 2,403,937

TREATMENT OF KERATINOUS MATERIAL

Herbert August Lubs, Wilmington, Del., assignor to E. I. du Pont de Nemours & Company, Wilmington, Del., a corporation of Delaware No Drawing. Application December 30, 1943, Serial No. 516,285

4 Claims. (Cl. 167—87.1)

This invention relates to the modification of keratinous materials, particularly wool or hair, with formamidinesulfinic acid.

A keratinous material, e. g., wool or hair, which has been treated with some agent capable of rupturing the disulfide linkages acquires certain desirable characteristics such as shrinkproofness, susceptibility to permanent set, and sensitivity to alkali. Inorganic sulfides, sulfites and cyanides have been used for this purpose but are known to degrade the keratinous material. Certain mercaptans have been suggested as treating agents in alkaline solution but these are disadvantageous because of their toxicity, volatility, insolubility in water, and disagreeable odor. Thioglycolic acid is known to convert the disulfide groups in wool to sulfhydryl groups but has the disadvantage of being strongly acid and therefore corrosive to metal equipment. Furthermore, wool or hair treated with this compound acquires an unpleasant odor.

This invention has as an object the provision of a process for modifying the physical and chemical properties of keratinous materials. A further object is a process for reducing the shrinkage tendency and increasing the reactivity toward alkali of keratinous materials, in particular wool. A still further object is a process for permanently setting hair, e. g., permanently waving, curling, or dekinking hair. Another object is to provide a wool containing sulfhydryl groups and which does not have disagreeable odor characteristics. Other objects will appear hereinafter.

These objects are accomplished by the following invention wherein a keratinous material, in particular wool or hair, is reacted with formamidinesulfinic acid

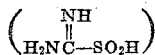

in aqueous alkaline solution until a substantial proportion, preferably at least about 25%, of the disulfide groups of said keratinous material have been converted to sulfhydryl groups.

In the preferred method of carrying out the process of this invention, wool fabric is immersed in a mildly alkaline solution, that is a solution having a pH of from just above the neutral point to 8.5, containing formamidinesulfinic acid. The solution may be buffered if desired with a suitable buffer solution, for example, disodium acid phosphate buffer solution. The reaction is then allowed to proceed for a period of 10–24 hours at a temperature of 20–50° C. The reaction is interrupted at any desired degree of completion as indicated by a quantitative determination of the amount of formamidinesulfinic acid consumed, or by a quantitative analysis of the number of disulfide groups which have been converted to the sulfhydryl groups. The product is washed with a suitable solvent such as water and/or alcohol and then dried in the air.

The more detailed practice of the invention is illustrated by the following examples, wherein parts given are by weight. There are, of course, many forms of the invention other than these specific embodiments.

Example I

A solution of formamidinesulfinic acid is prepared by adding 1172 parts of a 3% hydrogen peroxide solution to 39.4 parts of thiourea dissolved in 289 parts of water. The reaction mixture is maintained at a temperature below 10° C. during the addition of the hydrogen peroxide. This solution is adjusted to a pH of 8.2 by the addition of concentrated ammonium hydroxide and buffered at a pH of 8.25 with 5,000 parts of a 0.2 molar disodium acid phosphate solution.

Forty parts of wool serge is suspended in the buffered solution of formamidinesulfinic acid at room temperature (20–25° C.) for 24 hours, then washed with water and ethanol and air dried. The treated wool gives a strong sodium nitroprusside test for sulfhydryl groups and is more soluble in dilute alkali than the untreated wool. The conversion of disulfide linkages is nearly quantitative.

Example II

A solution containing 10 parts of formamidinesulfinic acid and 400 parts of water is adjusted to a pH of 8.6 by the addition of ethanolamine and buffered at a pH of 8.5 with 600 parts of a 0.2 molar disodium acid phosphate solution. Five parts of wool serge is suspended in the solution at a temperature of 30° C. for 16 hours. After thoroughly washing with water and ethanol, the treated wool gives a strong sodium nitroprusside test for thiol groups and is more soluble in dilute alkali than untreated wool. The conversion to thiol was nearly quantitative.

The treated wool prepared as above and containing free thiol groups is suspended in a solution containing 600 parts of methanol, 20 parts of trimethylene dibromide and 400 parts of a citric acid-disodium acid phosphate buffer solution (pH 8.0) at a temperature of 20–25° C. for 48 hours. After this treatment the wool gives a negative test for sulfhydryl groups and shows no apparent solubility in dilute alkali indicating reaction of the sulfhydryl groups with the trimethylene dibromide.

Keratinous materials which may be used in the process of this invention include wool in the form of fibers, threads, yarns, fabrics, or wool waste; various types of animal hair such as camel hair, mohair, horsehair, cattle hair, hog bristles, human hair; and additional keratinous materials, for example, chicken feathers, fur, animal hoofs, horns, and horn tips, etc.

An important application of the process described in this invention is the permanent waving or, alternatively, dekinking, of human hair and animal hair. Treatment of hair with formamidinesulfinic acid reduces the disulfide crosslinks in the keratin molecule to thiol groups. When reduced, the hair is more amenable to shaping than untreated hair because splitting of the disulfide crosslinks relieves stress in the keratin molecule. In order to obtain a permanent set, the reduced fiber is formed in any desired shape, as by means of a curler, and while maintained in this shape, is subjected to an oxidizing or other crosslinking treatment to reform crosslinks between the keratin molecules. Suitable oxidizing treatments include heating the reduced, shaped fiber in the presence of air or oxygen or reaction with hydrogen peroxide solutions. Suitable crosslinking reagents include alkylene dihalides, dibasic acid chlorides, etc. The recrosslinked hair retains the shape in which it was formed prior to the crosslinking treatment whereas untreated hair, subjected to the same shaping treatment, does not retain a permanent set. By treating hair of undesired, excessive curliness in a similar manner, employing a curler of reduced curliness, or even a hair retaining device having little or no curling effect, the curl may be reduced or even eliminated.

The formamidinesulfinic acid used in this process can conveniently be prepared from thiourea and hydrogen peroxide by the process described in U. S. Patent 2,150,921. The formamidinesulfinic acid can be isolated and added separately to the alkaline reaction mixture or it can be prepared directly without isolation from hydrogen peroxide and thiourea in the treating solution.

In carrying out of the process of this invention at least one mol or more of formamidinesulfinic acid per disulfide group in the wool or hair must be used in order to obtain suitable modification of the wool or hair to show differences in properties over the untreated wool or hair. Higher proportions of the sulfinic acid up to the limit of its solubility in the alkaline solution are also suitable. Ordinarily 25–40 mols of formamidinesulfinic acid per disulfide linkage in the wool are used to obtain adequate alkali solubility of the wool and reduction in the shrinkage tendencies. The number of disulfide linkages in the wool may be calculated from the per cent of sulfur in the wool on the basis of the group weight of the disulfide linkage as 64. Thus with a wool containing 3.1 grams of sulfur per 100 grams of wool there would be one disulfide linkage (molar basis) in $$\frac{64}{3.1} \times 100$$

or 2060 grams of wool. Since the molecular weight of formamidine-sulfinic acid is 108 there must be used 108 grams of formamidine-sulfinic acid per 2060 grams of keratinous material such as hair or wool or 1 gram per 19 grams of wool. The 25 to 40 mols per disulfide linkage is equivalent to about 1.3 to 2.1 parts of formamidinesulfinic acid to one part of wool or hair.

Any alkaline agent giving the desired pH can be used, including inorganic or organic bases or basic salts, in combination, if desired, with suitable buffers. The nitrogen bases, for example, ammonia, alkylamines, e. g., diethylamine; hydroxyamines, e. g., mono-, di-, or tri-ethanolamines; and quaternary ammonium hydroxides, e. g., tetramethylammonium hydroxide are particularly suitable. The pH of the alkaline solution is preferably maintained at from just above the neutral point to 8.5, i. e., from just above that of the salt to that of the salt plus alkali to a pH of 8.5. Conversion of the disulfide groups in the wool or hair to the sulfhydryl groups by means of formamidinesulfinic acid does not occur in acid solution, e. g., that of an aqueous formamidinesulfinic acid which has a pH of 2–3. An alkaline solution of pH above 8.5 tends to damage the wool or hair by degradation. The pH can be maintained at any point within the preferred range by use of suitable buffer solutions as, for example, by disodium acid phosphate.

Any temperature between 0° C. and 100° C. can be employed although the best results are obtained at 25–50° C. The reaction may be continued until substantially all of the disulfide linkages are reduced, as indicated by analysis for thiol groups. Ordinarily a period of 1–24 hours gives a practical degree of reaction, and in many instances 10–16 hours is sufficient. The shorter reaction times are preferred, as degradation of the keratinous material is minimized thereby.

The product produced by application to wool of the process of this invention are suitable for subsequent treatment with crosslinking agents such as organic and inorganic dihalides, metallic salts, and oxidizing agents and for use in the preparation of shrinkproof and alkali-sensitive wool textiles. For example, any of the crosslinking agents in Salzberg application Serial No. 438,509, filed April 10, 1942, can be reacted with wool which has been subjected to the process of this invention and contains sulfhydryl groups. A particular advantage of this invention is the fact that wool or hair which has been treated with formamidinesulfinic acid to convert the di-sulfide groups to sulfhydryl groups does not at the same time acquire an objectionable odor as in processes using, for example, thioglycolic acid to accomplish this result.

The above description and examples are intended to be illustrative only. Any modification of or variation therefrom which conforms to the spirit of the invention is intended to be included within the scope of the claims.

What is claimed is:

1. A process which comprises treating a keratinous material with an aqueous alkaline solution of at least one part by weight, per 19 parts by weight of the keratinous material, of formamidinesulfinic acid.

2. A process which comprises treating wool with an aqueous alkaline solution having a pH not greater than 8.5 of at least one part by weight, per 19 parts by weight of the wool, of an alkali formamidinesulfinate and continuing the reaction until a substantial proportion of the disulfide groups of the wool are converted to thiol groups.

3. A process which comprises treating a keratinous material with an aqueous alkaline solution of at least one part by weight, per 19 parts by weight of the keratinous material, of formamidinesulfinic acid and treating the so treated keratinous material with an alkylene dihalide.

4. A process which comprises treating hair with an aqueous alkaline solution having a pH not greater than 8.5 of at least one part by weight, per 19 parts by weight of the hair, of an alkali formamidinesulfinate, continuing the reaction until a substantial portion of the disulfide groups of the hair are converted to thiol groups and then, while maintaining the hair in a suitable condition of curl, subjecting the hair to a mild oxidation.

HERBERT AUGUST LUBS.